United States Patent Office 3,399,958
Patented Sept. 3, 1968

3,399,958
TREATMENT OF AQUEOUS ALKALINE ALUMINATE LIQUORS TO REMOVE CHROMIUM VALUES
William Haddon Brown, Little Rock, Ark., assignor to Reynolds Metals Company, Richmond, Va., a corporation of Delaware
No Drawing. Filed June 21, 1965, Ser. No. 465,790
4 Claims. (Cl. 23—52)

ABSTRACT OF THE DISCLOSURE

Dissolved chromium impurities are removed from aqueous alkali aluminate solutions obtained by the digestion of chromium containing aluminous ore with caustic alkali solution, by precipitation of the chromium with either ferruginous bauxite, or ferrous sulfate, or sodium sulfide.

---

This invention relates to a novel method for the removal of chromium from alkali metal aluminate solutions. More particularly, the invention concerns the removal of chromium from Bayer process liquors by precipitation with Arkansas bauxite, or ferrous sulfate, or sodium sulfide.

The novel method of the invention is adapted to the processing of chromium-containing aluminous ores, and particularly ores of the bauxite type. The term bauxite is generally used to designate a natural aggregate of aluminum-bearing minerals, more or less impure, in which the aluminum occurs largely as hydrated oxides.

The most commonly used method for extracting alumina from bauxite is the Bayer process. In accordance with this process, the ground bauxite is digested with an aqueous solution of an alkali, such as, for example, caustic soda, or with a mixture of caustic soda and sodium carbonate. There is obtained a slurry which comprises a suspension of the constituents of the bauxite other than alumina and which are insoluble in the alkali liquor. The liquor contains the alumina dissolved in the form of a supersaturated solution of sodium aluminate. The constituents of the bauxite which remain unattacked during the alkali digestion form an insoluble residue, which is separated from the sodium aluminate solution or Bayer liquor by filtration or sedimentation or a combination of both. The clarified liquor comprises an unstable solution of alumina from which less than one-half of the dissolved alumina is precipitated by seeding with alumina hydrate. The precipitated alumina hydrate is then separated from the liquor by sedimentation and filtration, washed, and calcined at high temperature to form alumina.

Purity specifications for alumina, and particularly alumina of ceramic grade, limit the chromic oxide ($Cr_2O_3$) content to 10 parts per million or less. Concentrations of chromium in excess of this limit impart a pink color to the fused ceramic product, which is unacceptable. In order to meet this specification, it is necessary for the Bayor liquor to have a maximum chromium oxide content which is no more than 1.8 parts per million (volume basis), or 0.0022 gram per kilogram, preferably less than 1 p.p.m.

Caribbean bauxite ores have come into increased use by the American aluminum industry, among which are the Jamaican bauxites which are relatively high in chromium. Owing to the solubility of chromium oxide in caustic alkalis, a substantial portion of this chromium is dissolved with the alumina and appears in the Bayer process liquors, to a level which may be of the order of 3 to 12 parts per million. The chromium in the trivalent state precipitates with the alumina trihydrate during Bayer precipitation although hexavalent chromium does not do so. Much of the chromium in the Bayer liquor thus passes through to the alumina. Calcined alumina obtained from such liquors may contain as much as 35 parts per million of chromium oxide ($Cr_2O_3$) which is far beyond the specification limits.

In accordance with the present invention it has been found surprisingly and unexpectedly, that removal of chromium is accomplished by the addition of either Arkansas bauxite, or of ferrous sulfate, or of sodium sulfide, to the alkali aluminate liquor, prior to or during digestion, or subsequently, as by treating the digested slurry or the clarified liquor.

Where Arkansas bauxite is employed as a chromium precipitant, in accordance with the invention, it is preferably one having a high iron oxide content, for example, between about 5 and about 16 percent FeO. Advantageously, the Arkansas bauxite is blended with the Jamaican bauxite during or prior to digestion. The proportion of Arkansas bauxite employed will depend upon its FeO content, but ranges from about 5 to about 10 pounds per 100 pounds of Jamaican bauxite, i.e., 5 to 10% by weight. An additional advantage of the use of Arkansas bauxite for chromium precipitation lies in its ready availability in this country, and that it is a material which will not normally be used for aluminum production because of its high iron content.

The nature of the action of the Arkansas bauxite upon the chromium present is not fully understood at the present time, but it is believed that the ferruginous character of the bauxite enables it to act as a collector for the chromium compounds of the Jamaican ore. It is known that if Arkansas bauxite is present during the digestion of the chromium containing aluminous ore, a significant portion of the chromium compounds from the aluminous ore which would otherwise be dissolved in the sodium aluminate liquor during digestion, will be precipitated and can be readily removed from the liquor, together with insoluble residues, during the clarification step which follows digestion.

Thus, for example, in accordance with the novel method of the invention, Arkansas bauxite is slurried with the alkali liquor and the liquor is pumped to the rod mill where the chromium containing aluminous ore is added. After grinding, the slurry is digested and then passed through clarification equipment where the solid residues with precipitated chromium compounds is discharged. Digestion is conventionally performed at about 290° F. for about 30 minutes.

The effectiveness of Arkansas bauxite as a collector for chromium compounds is shown by the data in Table 1 indicating the reduction in chromium oxide content of alkali liquor after digestion. The liquor was prepared by digesting 10.3 grams of Jamaican bauxite in 100 ml. of alkali at 290° F. for 30 minutes.

TABLE 1.—REMOVAL OF CHROMIUM BY ARKANSAS BAUXITE

| Amount of Arkansas bauxite per Jamaican bauxite, lbs./100 lbs. | $Cr_2O_3$ concentration of digester discharge (p.p.m.) |
|---|---|
| 5% FeO Content: | |
| 0 | 16 |
| 4 | 6 |
| 6 | 3 |
| 7 | 2 |
| 10 | 1 |
| 10% FeO Content: | |
| 0 | 14 |
| 2 | 4 |
| 3 | 2 |
| 5 | 1 |
| 16% FeO Content: | |
| 0 | 14 |
| 2 | 3 |
| 2 | 2 |
| 5 | 1 |

In accordance with another aspect of the invention, it was found that the addition of a solution of ferrous sulfate $FeSO_4$ to the digester slurry prior to or during digestion of chromium containing aluminous ore, such as Jamaican bauxite, is effective in reducing chromium content of the digester liquor. The action of the ferrous sulfate is believed due to initial reduction of the chromium present to the trivalent state, followed by reaction of the reduced chromium with ferrous iron to form a hydrated ferrous chromite or a coprecipitation as chromium hydroxide in association with a mass of ferric-ferrous hydroxides. The precipitated chromium is removed by filtration along with the other alkali insolubles in the case of digestion. The ferrous sulfate is also effectively applied to the treatment of Bayer liquor to precipitate chromium therefrom. In such case, the chromium is believed to coprecipitate with iron hydroxide gel.

Where ferrous sulfate is added during or prior to digestion of the chromium containing aluminous ore, it is advantageously employed in a concentration ranging from about 0.25 to about 0.50 pound per 100 pounds of Jamaican bauxite, preferably about 0.35 lb.

Advantageously, the ferrous sulfate is added in the form of an aqueous solution containing about 100 grams per liter $FeSO_4$.

The following table shows the effectiveness of ferrous sulfate in removing chromium from digester liquor during digestion, the digestion temperature being 290° F. and time 30 minutes:

TABLE 2.—REMOVAL OF CHROMIUM BY FERROUS SULFATE

| Lbs. $FeSO_4$ per 100 lbs. Jamaican bauxite | $Cr_2O_3$ content of digester discharge (p.p.m.) |
|---|---|
| 0 | 16 |
| 0.24 | 9 |
| 0.37 | 1 |
| 0.73 | 1 |
| 1.46 | 1 |

Ferrous sulfate may also be effectively employed, in accordance with the invention, in removing chromium from Bayer liquor and other sodium aluminate types of liquors, down to a chromium concentration of 1 p.p.m. or less. For this purpose, the concentration of ferrous sulfate solution ranges from about 0.25 to about 12 percent by weight. The amount of ferrous sulfate per 100 pounds of liquor may range from about 0.02 to about 0.10 lb. The treatment temperature is preferably in the range of about 120° to 150° F., and the time of treatment may range from about 30 minutes to 2 hours. In this way the chromium content of the liquor may be reduced from 15 p.p.m. to 1 p.p.m. or less.

In accordance with another aspect of the invention, chromium is removed from digester liquor by adding either prior to or during digestion an aqueous solution of an alkali metal sulfide, such as potassium sulfide or preferably, sodium sulfide. Chromium compounds thus precipitated collect on the insoluble ore residues and are readily removable upon clarification, together with such residues. The sodium sufide is also effectively applied to the treatment of Bayer liquor to precipitate chromium therefrom.

Where sodium sulfide is added during or prior to digestion of the chromium containing aluminous ore, it is advantageosuly employed in a concentration ranging from about 0.25 to about 0.50 pound per 100 pounds of Jamaican bauxite, preferably about 0.35 lb. Advantageously, the sodium sulfide is added in the form of an aqueous solution containing about 100 grams per liter of $Na_2S$.

The following table shows the effectiveness of sodium sulfide in removing chromium from digester liquor during the digestion, the digestion temperature being 290° F. and time 30 minutes:

TABLE 3.—REMOVAL OF CHROMIUM BY SODIUM SULFIDE

| Lbs. $Na_2S$ per 100 lbs. Jamaican bauxite | $Cr_2O_3$ content of digester discharge (p.p.m.) |
|---|---|
| 0 | 16 |
| 0.19 | 2 |
| 0.37 | 1 |
| 0.73 | 1 |
| 1.46 | 1 |

The following examples illustrate the practice of the invention, but are not to be regarded as limiting:

As is well known in the art

Example 1

A 10,000 lb. lot of Jamaican bauxite containing 0.04% $Cr_2O_3$ by weight was made into a slurry with caustic soda solution having a concentration of 115 g. $Na_2O$ per liter. A slurry of Arkansas bauxite containing 10% FeO by weight in the same alkali was prepared and admixed with the Jamaican bauxite slurry in a rod mill and ground therein for 5 to 7 minutes. The mixture was digested at 290° F. for about 30 minutes. The digested slurry was treated in conventional clarification equipment, with the underflow containing the precipitated chromium compounds and the insoluble residue being discarded. The clarified liquor was further processed in accordance with conventional procedure to form calcined alumina.

The amount of Arkansas bauxite was 5 lbs. per 100 lbs. of Jamaican bauxite, resulting in a reduction in the level of $Cr_2O_3$ content in the liquor after digestion to 1 p.p.m. The percentage of $Cr_2O_3$ in the calcined alumina was reduced from 0.018% for untreated digester liquor, to a level of less than 0.001%.

Example 2

350 lbs. of 100 g.p.l. $FeSo_4$ liquor was admixed with a Jamaican bauxite-caustic soda solution as in Example 1. The resulting clarified digestion liquor contained 1 p.p.m. $Cr_2O_3$ and produced a calcined alumina of less than .001% $Cr_2O_3$. Without the use of $FeSO_4$, the clarified liquor contained about 16 p.p.m. $Cr_2O_3$.

Example 3

Clarified caustic aluminate liquor, originating from a Jamaican bauxite digestion as in Example 1 and containing 15 p.p.m. $Cr_2O_3$, was treated with ferrous sulfate solution which contained 116 g.p.l. $FeSO_4$ and was used in proportions to give 0.025 lb. $FeSO_4$ per 100 lbs. of clarified liquor. The mixture was then agitated by mechanical stirring for 1 hour at 150° F. after which the precipitated iron hydroxide-chromium compound was separated by filtration. The filtrate contained 1 p.p.m. $Cr_2O_3$ and a calcined alumina produced therefrom contained less than 0.001% $Cr_2O_3$.

Example 4

350 lbs. of a 100 g.p.l. $Na_2S$ liquor was added to a Jamaican bauxite-caustic soda solution as in Example 1. The resulting clarified digestion liquor contained 1 p.p.m. $Cr_2O_3$ and produced a calcined alumina of less than 0.001% $Cr_2O_3$. Without the addition of sodium sulfide, the clarified liquor contained about 0.0042 g./kg. $Cr_2O_3$.

What is claimed is:

1. Method for the removal of dissolved chromium from an aqueous slurry obtained by the digestion of a chromium containing aluminous ore with caustic alkali solution, said slurry containing alkali insoluble ore residue, comprising the steps of adding to said slurry from about 5% to about 10% by weight of said ore of ferruginous bauxite having an FeO content between about 5% and about 16% by weight, to remove chromium therefrom as insoluble componds, and separating the insoluble compounds and insoluble ore residue from the digestion liquor.

2. The method of claim 3 in which the aluminous ore is Jamaican bauxite.

3. The method of claim 1 in which the ferruginous bauxite is added to the ore prior to digestion.

4. The method of claim 1 in which the ferruginous bauxite is added to the ore during digestion.

References Cited

UNITED STATES PATENTS

| | | | |
|---|---|---|---|
| 2,159,843 | 5/1939 | Davies | 23—52 |
| 2,442,226 | 5/1948 | Wall | 23—52 |
| 2,612,435 | 9/1952 | Perrin et al. | 23—52 |
| 2,926,069 | 2/1960 | Perrin et al. | 23—52 |

OSCAR R. VERTIZ, *Examiner.*

H. T. CARTER, *Assistant Examiner.*